US007843890B2

(12) United States Patent
Tirkkonen et al.

(10) Patent No.: US 7,843,890 B2
(45) Date of Patent: Nov. 30, 2010

(54) DOWNLINK SYNCHRONIZATION CHANNELS TRANSPARENT TO SHARED CHANNEL USERS

(75) Inventors: Olav Tirkkonen, Helsinki (FI); Ülo Parts, Helsinki (FI)

(73) Assignee: Nokia Corporation, Espoo (FI)

( * ) Notice: Subject to any disclaimer, the term of this patent is extended or adjusted under 35 U.S.C. 154(b) by 635 days.

(21) Appl. No.: 11/543,462

(22) Filed: Oct. 4, 2006

(65) Prior Publication Data

US 2007/0076668 A1    Apr. 5, 2007

Related U.S. Application Data

(60) Provisional application No. 60/724,023, filed on Oct. 5, 2005.

(51) Int. Cl.
*H04B 7/216* (2006.01)
(52) U.S. Cl. ...................................... 370/335
(58) Field of Classification Search ................ 370/331; 455/432.1, 433, 450
See application file for complete search history.

(56) References Cited

U.S. PATENT DOCUMENTS

| 5,903,552 | A | * | 5/1999 | Raith ......................... 370/337 |
| 5,920,563 | A | * | 7/1999 | Fukui et al. ............... 370/395.7 |
| 7,085,248 | B1 | * | 8/2006 | Holma et al. ................. 370/329 |
| 2002/0064211 | A1 | | 5/2002 | Chen et al. |
| 2004/0114552 | A1 | * | 6/2004 | Lim et al. .................... 370/324 |

FOREIGN PATENT DOCUMENTS

EP    1448007 A1    8/2004
EP    1475899 A1    11/2004

OTHER PUBLICATIONS

3GPP TSG RAN WG1#42, Texas Instruments, Downlink Synchronization Channel Schemes for E-UTRA, London, UK, Aug. 29-Sep. 2, 2005.
3GPP TSG RAN WG1 #42 on LTE, NTT DoCoMo, Fujitsu, NEC, SHARP, Physical Channel Concept for Scalable Bandwidth in Evolved UTRA Downlink, London, UK, Aug. 29, Sep. 2, 2005.
3GPP TSG RAN WG1#42, Nortel, Proposal for the Downlink Synchronization Channel for E-UTRA, London, UK, Aug. 29-Sep. 2, 2005.
3GPP TSG RAN WG1 Ad Hoc on LTE, Physical Channels and Multiplexing in Evolved UTRA Downlink, Sophia Antipolis, France, Jun. 20-21, 2005, http://www.3gpp.org/ftp/tsg_ran/WG1_RL1/TSGR1_AH/LTE_AH_June-05/Docs/R1-050590.zip see p. 12, line 7-p. 24, line 1; all figures; p. 12-24.

* cited by examiner

*Primary Examiner*—Dwayne D Bost
*Assistant Examiner*—Joseph Dean, Jr.

(57) ABSTRACT

The specification and drawings present a new method, system, apparatus and software product for locating synchronization channels (SCH) in a downlink which are received by a user equipment (UE), such that the downlink synchronization channels are transparent to shared channel users (or UE) which can be used, e.g., in evolving and future systems such as EUTRAN, 4G, 3GPP2, etc. The synchronization channels are arranged so that they are transparent to the UE in a normal active operation state. For that, the resources given to the SCH are chosen to be one or more allocatable resources (resource units) in a sub-frame or in a plurality of sub-frames. In an allocation table, these resources may not be allocated to the UE and in the active state the UE sees that and discards these resources just as it discards any other resource that is not allocated to it.

37 Claims, 5 Drawing Sheets

DOWNLINK SYNCHRONIZATION CHANNELS TRANSPARENT TO SHARED CHANNEL USERS

PRIORITY AND CROSS-REFERENCE TO RELATED APPLICATION

This application claims priority from U.S. Provisional Application Ser. No. 60/724,023 filed on Oct. 5, 2005.

TECHNICAL FIELD

This invention generally relates to communications, e.g., wireless communications and more specifically to locating downlink synchronization channels transparent to shared channel users.

BACKGROUND ART

Synchronization channels are mainly used for cell search purposes. Typically this includes primarily initial cell search, and possibly handover measurements.

For initial cell search, the user looks for a known sequence (a Primary Synchronization Channel (P-SCH)) and tries to identify the carrier and frame/symbol timing from it. Cell search methodology then proceeds by identifying the identity of the cell, possibly using a Secondary Synchronization Channel S-SCH and a cell specific scrambling/spreading/pilot code, i.e., a common pilot channel. The P-SCH is transmitted in a similar form from all (or at least multiple) cells in the system, and by receiving the P-SCH over the P-SCH cycle, an estimate of the signal strength of all cells transmitting in the same band can be acquired. After synchronizing to the downlink transmission and possibly acquiring a channel estimate for at least part of the bandwidth, the user may decode a part of a broadcast channel and may learn system information that is required to perform random access in the uplink and to read the downlink traffic channels and the control channels associated with the traffic channels.

The users in an active state are typically not interested in receiving the SCH of the serving cell. They perform fine synchronization and estimate the channel to the serving cell directly from the cell specific pilots. When performing handover measurements, the user equipment (UE) may know the identities of neighboring cells, so the UE may start directly looking for pilot codes of the neighbors. It may be more effective, however, to search for strongest neighbors by running cell search algorithms, looking for the P-SCHs of other cells. In an asynchronous network other cells' SCHs are not to be found at the same timing as the SCHs in the serving cell. From the resource allocation point of view, it is likely that active state UEs follow common control channels (CCCH), on which, e.g., an Allocation Table is transmitted. This allocation table divides resources, e.g., on a Downlink Shared Channel (DSCH).

The radio transmission may be divided into radio frames, and the radio frames to sub-frames. For the purposes of this invention, a frame is a time period during which the SCHs are transmitted, and a sub-frame is a time period during which the resources are allocated by the CCCH. There are multiple sub-frames in a frame. A normal sub-frame could be, for example, such that there are pilots and the CCCH in the first OFDM-symbol, and the six consecutive OFDM-symbols are the DSCH.

Figure 1:
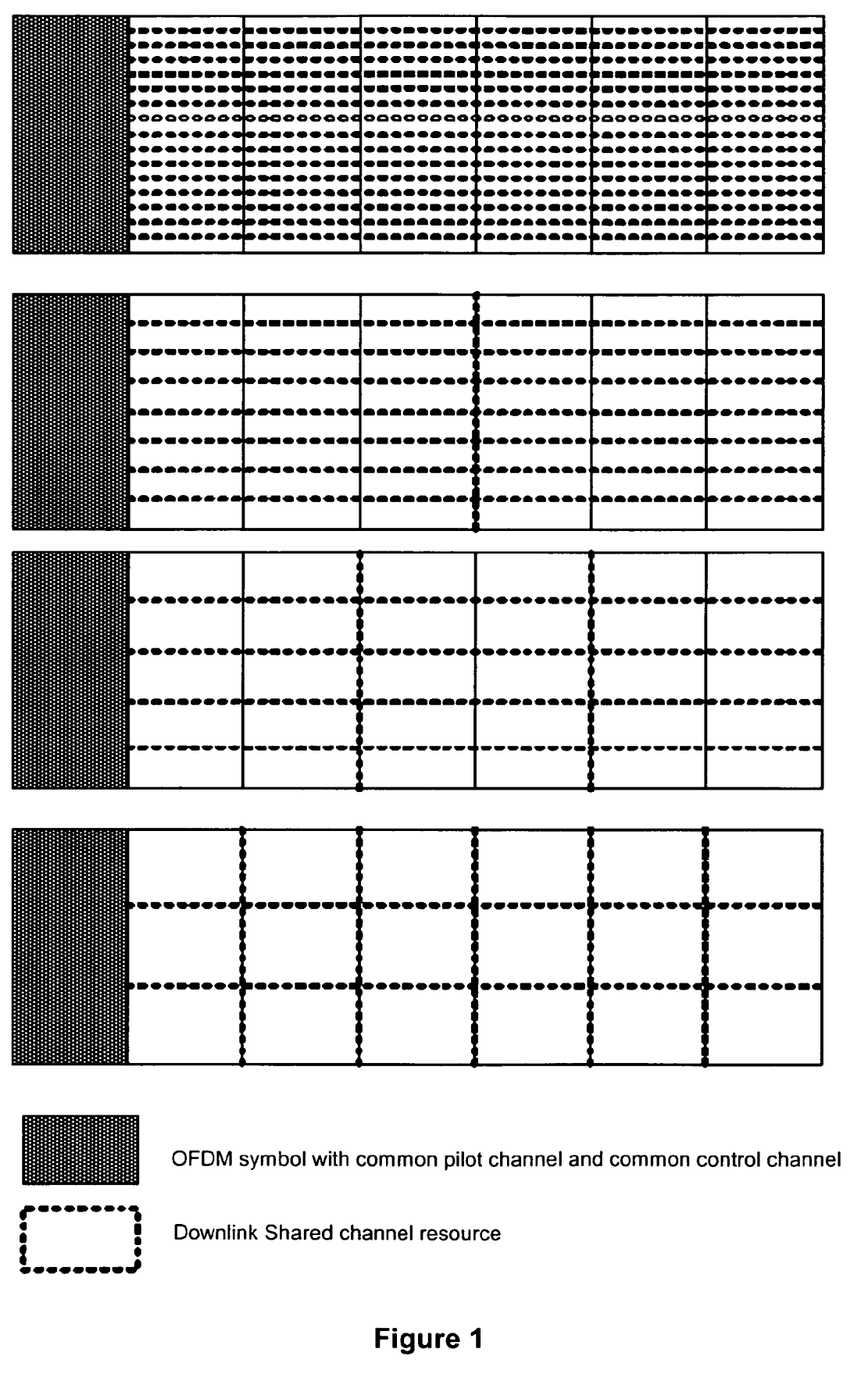
FIG. 1 is a time diagram of a typical EUTRA sub-frame with resource units and shared/control/pilot channel multiplexing.

There can be a predefined principle by which the CCCH addresses resources in the DSCH. For this, e.g., the resources in the DSCH are divided into resource units, which may be separately allocated. In FIG. 1, a DL (downlink) EUTRA (evolved universal terrestrial radio access) sub-frame is depicted with resource units and shared/control/pilot channel multiplexing.

In FIG. 1, there are seven OFDM (orthogonal frequency division multiplexing) symbols in a sub-frame. As an example, the first symbol is reserved for the common pilot channel and the common control channel. The remaining six symbols are dedicated to the downlink shared channel. FIG. 1 shows four different ways (examples) of dividing the DSCH resources to resource units as depicted. The uppermost variant is pure frequency division multiplexing (FDM). A number of sub-carriers during the whole duration of the DSCH belong to the resource unit. The other variants involve different degrees of time division multiplexing (TDM) in addition to the FDM. The sensible TDM units are comprised of 6, 3, 2, and 1 OFDM symbols. It is shown pictorially that depending on the degree of applying the TDM, the resource unit in a frequency domain may be smaller or bigger, so that the total resource unit is approximately of the same size. The size of the resource unit is determined by two competing principles. First, there is a limited addressing space, set by the limited size of the CCCH, favouring larger resource units. There is however a need for a specified minimum resource unit size.

Tentatively, it is expected to be 75, 150, 300, 600, 900 and 1200 subcarriers in an DL EUTRAN OFDM symbol on 1.25, 2.5, 5, 10, 15 and 20 MHz channel bandwidths, respectively. Possible alternatives for the resource unit size in the frequency domain (i.e., reflecting a number of subcarriers or a width of the resource unit in a frequency domain) that have been discussed are, for example, 12, 25, 30, and 50. The two latter would not fit into the 1.25 MHz bandwidth alternative, whereas the first would not fit into the two narrowest bandwidth alternatives. In case of a resource unit size of 12 sub-carriers, the number of subcarriers in the narrower bandwidth alternatives may be reduced. Alternatively, some resource units may be defined to be larger, or smaller.

In addition to the rectangular resource units depicted in FIG. 1, distributed resource units have been discussed. These are such that the sub-carriers of the resource unit are not necessarily all neighbors of each other. This way, there is more frequency diversity in a resource unit. Such resource units may be described as in FIG. 1, if the sub-carriers in the resource allocation are mapped to the true sub-carriers used for transmission by a permutation. In addition, a permutation may operate in different ways on different OFDM-symbols, resulting in arbitrarily complex sets of resource units.

DISCLOSURE OF THE INVENTION

According to a first aspect of the invention, a method, comprises: assigning N resource units for the synchronization channels in a predetermined position in at least one predetermined time interval of each of radio frames of a downlink channel signal according to a predetermined criterion, N being at least a value of one; receiving the downlink channel signal with at least one frame of the radio frames by a user equipment from a network element selected by the user equipment; and processing by the user equipment data comprised in the at least one frame but automatically discarding the N resource units assigned for the synchronization channels in the at least one predetermined time interval of the at least one frame, for making the synchronization channels transparent to the user equipment in a normal active operation state.

According further to the first aspect of the invention, before the receiving the downlink channel signal with the at least one frame of the radio frames, the method may comprise: receiving the downlink channel signal with at least one initial frame of the radio frames by the user equipment, wherein information on the synchronization channels may be provided in the N resource units from P cells for connecting the user equipment to a network, P being at least a value of one; and selecting one cell of the P cells for connecting the user equipment to the network using the information on the synchronization channels by a predetermined algorithm, wherein the network element may be the one selected cell.

According further to the first aspect of the invention, the each of the N resource units may have a duration of K symbols comprising a single time division multiplexing period and each of the N resource units may have a frequency chosen out of M frequency bands of orthogonal frequency division multiplexing, K and M each being at least a value of one, Still further according to the first aspect of the invention, the at least one predetermined time interval may comprise a symbol for a common control channel carrying an allocation table and at least one symbol comprising data; wherein the allocation table does not allocate the N resource units to the user equipment when it is in the normal active operation state.

According further to the first aspect of the invention, the method may further comprise: processing, instead of automatically discarding, the N resource units assigned for the synchronization channels in the at least one predetermined time interval of the at least one frame by the user equipment, for evaluating the synchronization channels provided from the one cell and F-1 neighbouring cells for connecting the user equipment to the network, F being at least a value of one; re-selecting one cell of the F-1 cells for connecting the user to the network using the predetermined algorithm; receiving the downlink channel signal with at least one further frame of the radio frames from the reselecting cell by the user equipment; and processing data comprised in the at least one further frame but automatically discarding the N resource units assigned for the synchronization channels in the at least one predetermined time interval of the at least one further frame by the user equipment, for making the synchronization channels transparent to the user equipment in the normal active operation state. Further, the P cells and F-1 cells may be nodes B, base transceiver stations or their combination thereof.

According still further to the first aspect of the invention, the at least one predetermined time interval may be a sub-frame of a radio frame of the radio frames. Further, the synchronization channels may be placed in one sub-frame of the radio frame. Further still, the radio frame may be 10 ms and the sub-frame may be 0.5 ms.

According still further to the first aspect of the invention, the downlink channel signal may comprise a downlink shared channel.

According yet further still to the first aspect of the invention, the at least one of the synchronization channels may be a primary synchronization channel.

Yet still further according to the first aspect of the invention, the at least one of the synchronization channels may be a secondary synchronization channel.

Still yet further according to the first aspect of the invention, the assigning may be performed by a system designer or by a network comprising the network element.

According to a second aspect of the invention, a computer program product comprises: a computer readable storage structure embodying computer program code thereon for execution by a computer processor with the computer program code, wherein the computer program code comprises instructions for performing the first aspect of the invention, indicated as being performed by any component or a combination of components of the user equipment or a network comprising the network element.

According to a third aspect of the invention, a system for locating synchronization channels (SCH) in a downlink, comprises: a network element, for providing a downlink channel signal, wherein N resource units for the synchronization channels in a predetermined position in at least one predetermined time interval of each of radio frames of the downlink channel signal are assigned according to a predetermined criterion, N being at least a value of one; and a user equipment, for selecting the network element, for receiving the downlink channel signal with at least one frame of the radio frames from the network element, for processing data comprised in the at least one frame but automatically discarding the N resource units assigned for the synchronization channels in the at least one predetermined time interval of the at least one frame, for making the synchronization channels transparent to the user equipment in a normal active operation state.

Further according to the third aspect of the invention, before the receiving of the downlink channel signal with the at least one frame of the radio frames, the user equipment may receive the downlink channel signal with at least one initial frame of the radio frames, wherein information on the synchronization channels may be configured to provided in the N resource units from P cells for connecting the user equipment to a network, P being at least a value of one, and wherein further the user equipment may be configured to select one cell of the P cells for connecting the user equipment to the network using the information on the synchronization channels by a predetermined algorithm, wherein the network element is the one selected cell. Further, the P cells may be nodes B, base transceiver stations or their combination thereof.

Still further according to the third aspect of the invention, the at least one predetermined time interval may be a sub-frame of the radio frame.

According to a fourth aspect of the invention, the user equipment, comprises: a receiving/transmitting/processing module, responsive to a control signal, responsive to a downlink channel signal with at least one frame of radio frames from a network element selected by the user equipment, for processing data comprised in the at least one frame but automatically discarding N resource units assigned for the synchronization channels in a predetermined position in at least one predetermined time interval of the at least one frame, for making the synchronization channels transparent to the user equipment in a normal active operation state; and a synchronization channel and allocation control block, for providing a control signal for automatically discarding the N resource units, wherein the N resource units for synchronization channels in the at least one predetermined time interval of each of the radio frames of the downlink channel signal are assigned according to a predetermined criterion, N being at least a value of one.

According further to the fourth aspect of the invention, the synchronization channel and allocation control block may be also for providing a control signal for not discarding but processing the N resource units by the user equipment.

Further according to the fourth aspect of the invention, the receiving/transmitting/processing module may receive the downlink channel signal with at least one initial frame of the radio frames, wherein information on the synchronization channels may be provided in the N resource units from P cells for connecting the user equipment to a network, P being at least a value of one, and further the user equipment is configured for selecting one cell of the P cells for connecting the user equipment to the network using the information on the synchronization channels by a predetermined algorithm, wherein the network element may be the one selected cell.

Still further according to the fourth aspect of the invention, each of the N resource units may have a duration of K symbols comprising a single time division multiplexing period and each of the N resource units may have a frequency chosen out of M frequency bands of orthogonal frequency division multiplexing, K and M each being at least a value of one.

According further to the fourth aspect of the invention, the at least one predetermined time interval may comprise a symbol for a common control channel carrying an allocation table and at least one symbol comprising data; wherein the allocation table does not allocate the N resource units to the user equipment when it is in the normal active operation state.

According still further to the fourth aspect of the invention, the at least one predetermined time interval may be a sub-frame of a radio frame of the radio frames. Further, the synchronization channels may be placed in one sub-frame of the radio frame.

Further still, the radio frame may be 10 ms and the sub-frame may be 0.5 ms.

According further still to the fourth aspect of the invention, the downlink channel signal may comprise a downlink shared channel.

According further still to the fourth aspect of the invention, the at least one of the synchronization channels may be a primary synchronization channel.

Yet still further according to the fourth aspect of the invention, at least one of the synchronization channels may be a secondary synchronization channel.

Still yet further according to the fourth aspect of the invention, an integrated circuit may comprise the receiving/transmitting/processing module and the synchronization channel and allocation control block.

According to a fifth aspect of the invention, a network element, comprises: an allocation control block, for providing a downlink channel signal to a user equipment, wherein N resource units for synchronization channels in a predetermined position in at least one predetermined time interval of each of radio frames of the downlink channel signal are assigned according to a predetermined criterion, N being at least a value of one and the N resource units comprise information used by the user equipment for selecting the network element for communicating with a network, wherein, after the network element is selected by the user equipment, and the N resource units are automatically discarded by the user equipment while processing data comprised in radio frames, for making the synchronization channels transparent to the user equipment in a normal active operation state.

According further to the fifth aspect of the invention, the at least one predetermined time interval may be a sub-frame of a radio frame of the radio frames.

According to a sixth aspect of the invention, a user equipment, comprises: means for receiving, transmitting and processing, responsive to a control signal, responsive to a downlink channel signal with at least one frame of radio frames from a network element selected by the user equipment, for processing data comprised in the at least one frame but automatically discarding N resource units assigned for the synchronization channels in a predetermined position in at least one predetermined time interval of the at least one frame, thus making the synchronization channels transparent to the user equipment in a normal active operation state; and means for synchronization and control, for providing a control signal for automatically discarding the N resource units, wherein the N resource units, for synchronization channels in the at least one predetermined time interval of each of the radio frames of the downlink channel signal are assigned according to a predetermined criterion, N being at least a value of one.

According further to the sixth aspect of the invention, the means for synchronization and control may also be for providing a control signal for not discarding but processing the N resource units by the user equipment.

MODES FOR CARRYING OUT THE INVENTION

A new method, system, apparatus and software product are presented for locating synchronization channels (SCH) in a downlink (a direction from a user to a network) which are received by a user equipment (UE), such that the downlink (DL) synchronization channels are transparent to shared channel users (or user equipments) which can be used, e.g., in evolving and future systems such as EUTRA (evolved universal terrestrial radio access), 4G (fourth generation mobile communication system), 3GPP2 (third generation partnership project 2), etc., and possibly in other evolving technologies for communications, e.g., wireless communications.

According to an embodiment of the present invention, N resource units for the synchronization channels (SCH) are assigned (the assigning can be performed, e.g., by a system designer or by a network and all UEs are aware of the assigning) in a predetermined position in a predetermined time interval or predetermined time intervals of each of radio frames of a downlink channel signal according to a predetermined criterion, N being at least a value of one. Then data contained in the radio frames of the downlink channel signal received by the user equipment (UE) from a network element (i.e., a serving cell) is processed normally by the user equipment but the N resource units assigned for the synchronization channels in the predetermined time interval or the predetermined time intervals of the radio frames are automatically discarded, thus making the synchronization channels transparent to the user equipment in a normal active operation state.

Moreover, according to a further embodiment of the present invention, during selection or reselection of the network element (or a cell which can be, e.g., a node B or a base transceiver station) by the user equipment, the user equipment receives the downlink channel signal with the radio frames comprising information on the synchronization channels provided in the N resource units from P cells which can be used for connecting the user equipment to a network, P being at least a value of one. Further, the user equipment selects one cell of said P cells for connecting said user equipment to the network using the information on said synchronization channels by a predetermined algorithm. After the cell selection (or reselection) is performed, the N resource units assigned for the synchronization channels are automatically discarded by the user equipment as described above.

Thus, according to an embodiment of the present invention, the synchronization channels are arranged in such a way so that they are transparent to the UE in the normal active operation state. For that, the resources given to the SCH are chosen to be one or more allocatable resources (resource units) in a sub-frame (e.g., a predetermined time interval) or in a plurality of sub-frames. In the CCCH signaling (e.g., in the Allocation Table) these resources may not be allocated to anybody, or they may be allocated to a dummy user. In the active state the UE reads the CCCH and sees that those resources are not allocated to it, and discards them just as it discards any other resource that is not allocated to it.

Typically, the SCHs would be inserted at specified places in the radio frame, which in the EUTRA is foreseen to be, e.g., 10 ms, consisting of 20 sub-frames of 0.5 ms each. At a normal operation in the EUTRA it is, however, foreseen to operate at a sub-frame to sub-frame basis. If there is no connection between the resources reserved for the SCHs and the resource units of the DSCH in a typical sub-frame, this means that the UEs that are receiving data in sub-frames with the SCHs, need to receive and process the sub-frame in a different way from sub-frames without SCHs, even if they have no interest in the SCHs themselves. Thus, according to embodiments of the present invention, the reducing the complexity of receivers not involved in a cell search is implemented, i.e., the active state UE does not need to do anything to skip synchronization channels, the frame structure makes the SCHs completely transparent to the users not interested in them.

Moreover, according to embodiments of the present invention, each of the N resource units can have a duration of K symbols comprising a single time division multiplexing (TDM) period and each of the N resource can have a frequency chosen out of M frequency bands of orthogonal frequency division multiplexing (OFDM), K and M each being at least a value of one. Relevant examples are demonstrated in FIGS. 3 and 4 as described below. Furthermore, the predetermined time interval or each of the predetermined time intervals can comprise a symbol for a common control channel (CCCH) carrying an allocation table and the allocation table does not allocate the N resource units to the user equipment as recited above in the active state.

According to various embodiments of the present invention, the synchronization channels can be placed in one sub-frame of the radio frame. Further, the radio frame can be 10 ms and the sub-frame can be 0.5 ms. Still further, the downlink channel signal can comprise a downlink shared channel (DSCH). Moreover, the synchronization channel can be a primary synchronization channel (P-SCH) and/or a secondary synchronization channel (S-SCH).

Also, it is noted that various embodiments of the present invention recited herein can be used separately, combined or selectively combined for specific applications.

Figure 2:
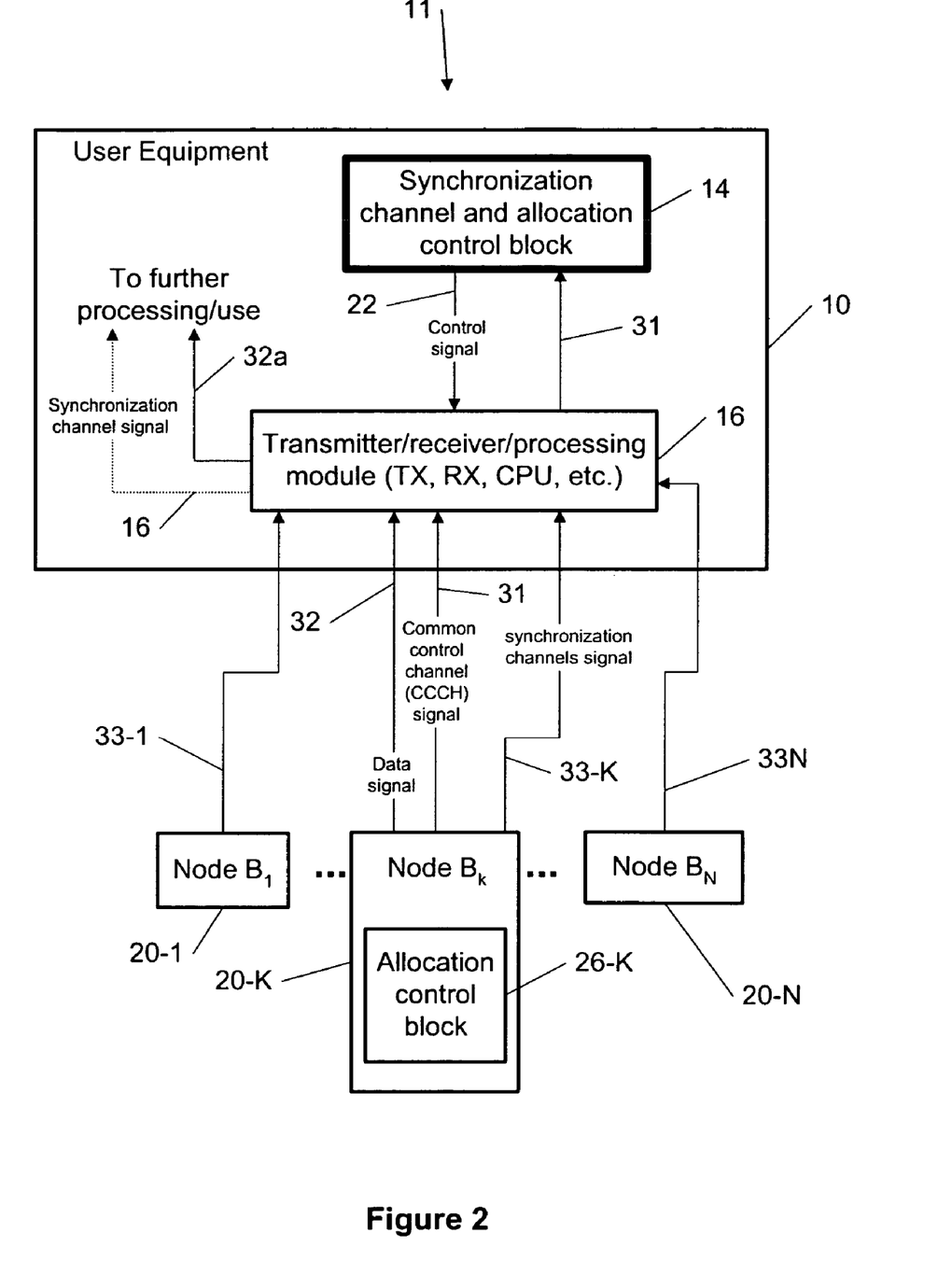
FIG. 2 is a block diagram which demonstrates locating downlink synchronization channels transparent to shared channel users, according to an embodiment of the present invention.

FIG. 2 is an example among others of a block diagram which demonstrates locating downlink synchronization channels transparent to shared channel users represented by a user equipment 10, which can be used ,e.g., in evolved UTRA network 11, according to an embodiment of the present invention. The user equipment (UE) 10 can be a wireless device, a portable device, a mobile communication device or a mobile phone, etc.

In the example of FIG. 2, the user equipment (UE) 10 comprises a synchronization channel and allocation control block 14 and a transmitter/receiver/processing module 16. The synchronization channel and allocation control block 14 controls steps performed by the user equipment 10 related to various embodiments of the present invention. The block 14 can be implemented as a software, a hardware block or a combination thereof. Furthermore, the block 14 can be implemented as a separate block or can be combined with any other standard block of the user equipment 10. The transmitter/receiver/processing block 16 can be implemented in a plurality of ways, as well known in the art. Typically, the module 16 can include a transmitter, a receiver, a CPU (central processing unit), etc. Basically, the module 16 is for providing an effective communication of the user equipment 14 with the network including signal processing.

FIG. 2 also shows N nodes B: 20-1, 20-2, . . . 20-K, . . . , 20N as a part of a network 11. The user equipment 14 is connected through a chosen (selected) node (cell) $B_k$ 20-K to the network 11. N nodes B 20-1, 20-2, . . . 20-K, . . . , 20N can provided synchronization channel signals 33-1, 33-2, . . . 33-K, . . . , 33N, respectively, in the assigned N resource units to the block 16 of the UE 10 according to the embodiments of the present invention, as described above. The allocation control block 26-K (only shown for the cell 20-K) is for providing a downlink channel signal with an appropriate allocation of the synchronization channels in the predetermined position in the predetermined time interval or in the predetermined time intervals of the radio frames to the UE 10.

According to the embodiments of the present invention, first, when the UE 10 started to search for a cell, the block 14 instructs the block 16 using the control signal 22 not to discard SCH channels comprised in the N resource units from the downlink channel signal, and the synchronization channel signals 33-1, 33-2, . . . 33-K, . . . , 33N are used by the UE 10 for selecting the appropriate cell according to the predetermined algorithm. Then after the cell (e.g., the node B 20-K) is selected by the UE 10, the block 14 instructs the block 14 using the signal 22 to discard the SCH channels. Thus the block 16 receives from the cell 20-K and processes other components (symbols) comprised in the downlink channel signal: the data signal 32 by providing the output data signal 32a and the common control (CCCH) signal 31 by providing it to the block 14. However, the block 16 discards all synchronization channel signals 33-1, 33-2, . . . 33-K, . . . , 33N, according to the embodiment of the present invention. Then if the signal from a serving cell 20-K becomes somewhat weak (e.g., using a predetermined threshold), the block 14 instructs the block 16 again not to discard SCH channels and start searching for a new (better) cell using the synchronization channel signals 33-1, 33-2, . . . 33-K, . . . , 33N.

Figure 3:
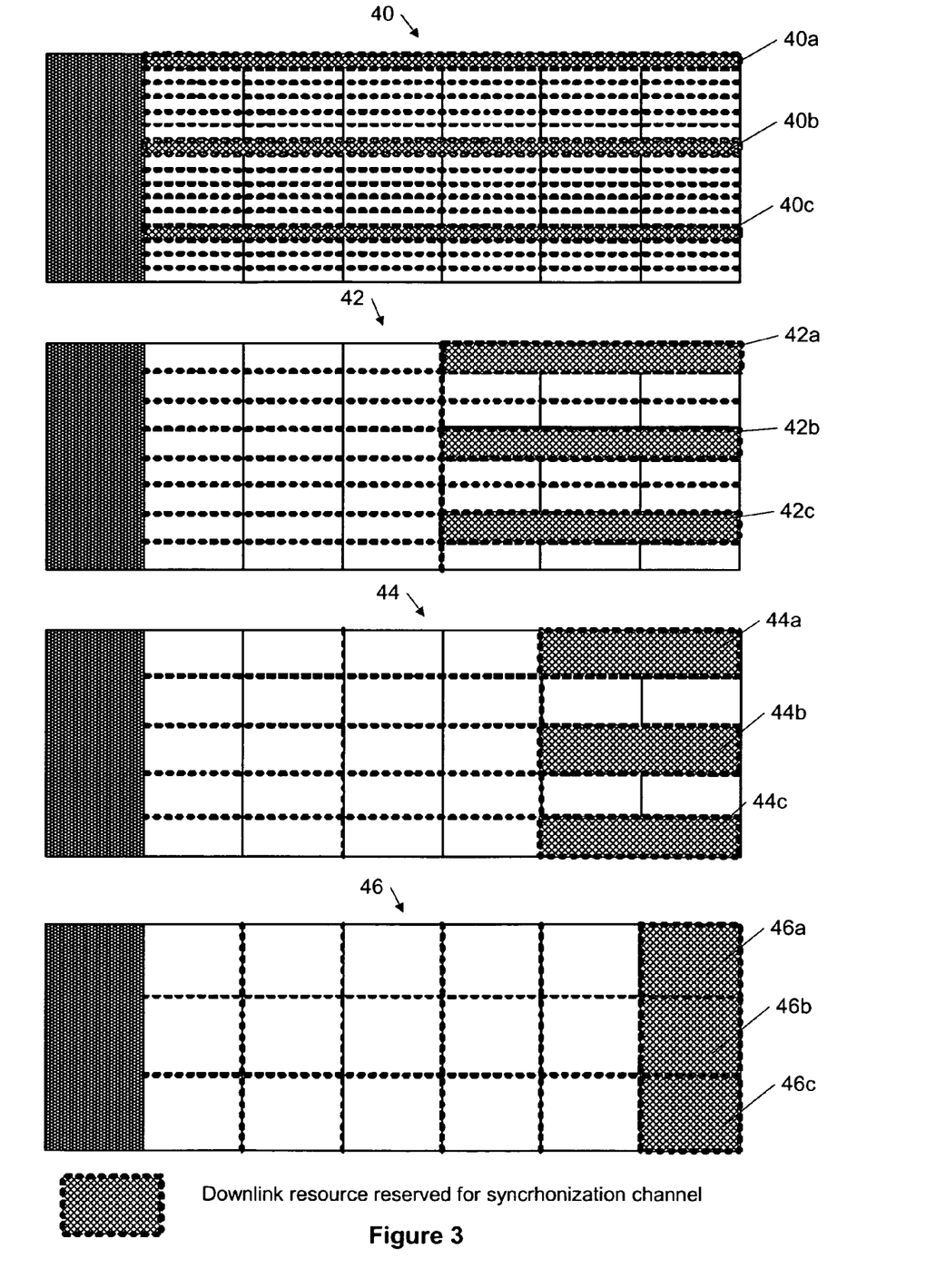
FIG. 3 is a time diagram of sub-frame formats with synchronization channels, according to an embodiment of the present invention.

Using the resource addressing principles according to FIG. 1, an exemplary embodiment of the present invention is depicted in FIG. 3. FIG. 3 is an example among others of a time diagram of sub-frame formats with synchronization channels, according to an embodiment of the present invention. The sub-frame formats with SCHs are depicted for the alternatives with TDM (time division multiplexing) over 6, 3, 2 and 1 OFDM symbols in sub-frames 40, 42, 44 and 46, respectively. The resource units reserved for synchronization are depicted as diverse in frequency with corresponding resource units for synchronization channels using different frequency bands of the OFDM: 40a, 40b and 40c for the sub-frames 40; 42a, 42b and 42c for the sub-frames 42; 44a, 44b and 44c for the sub-frames 44, and 46a, 46b and 46c for the sub-frames 46, respectively. Note, that with a permutation between the rectangular addressing and used sub-carriers, a sub-frame format according to FIG. 3 can be mapped to any distributed division of resources, as discussed above.

Figure 4:
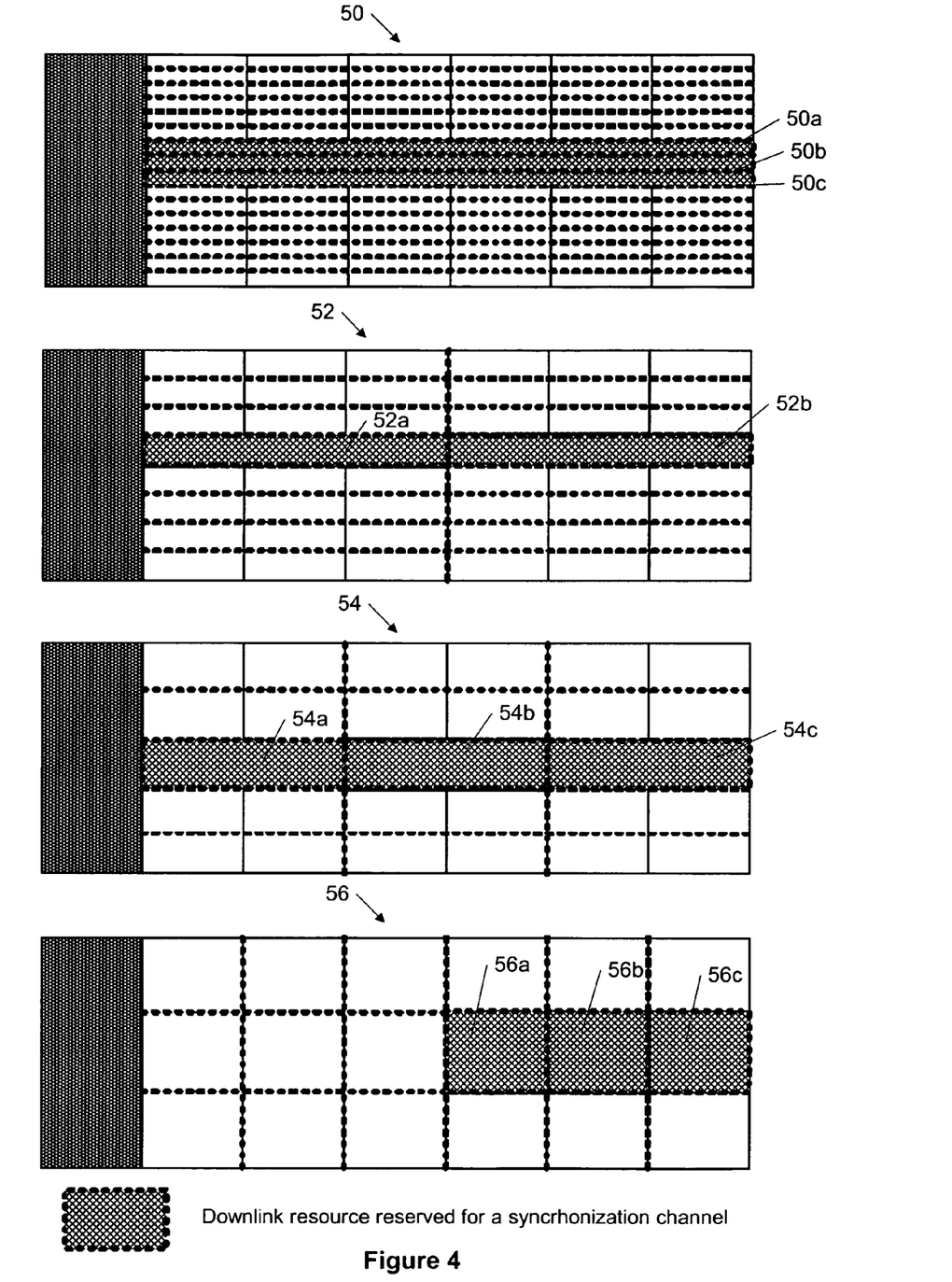
FIG. 4 is a time diagram of sub-frame formats with synchronization channels concentrated on a narrow frequency sub-band, according to an embodiment of the present invention.

In can be useful to concentrate the synchronization channels within a narrow sub-band of the full bandwidth used by a EUTRA deployment. In this case, consecutive resource units are reserved for the synchronization channel. Such embodiments of the present invention are depicted in FIG. 4. FIG. 4 is an example among others of a time diagram of sub-frame formats with synchronization channels concentrated on a narrow frequency sub-band, according to an embodiment of the present invention.

For the sub-frames 50, the resource units for synchronization channels 50a, 50b and 50c use the frequency bands of the OFDM chosen next to each other in the center of the sub-band. For the sub-frames 52, the resource units for synchronization channels 52a and 52b use the same frequency band in the center of the sub-band but extended to two TDM units occupying all 6 symbols.

For the sub-frames 54, the resource units for synchronization channels 54a, 54b and 54c use the same frequency band in the center of the sub-band but extended to three TDM units occupying all 6 symbols. Finally, for the sub-frames 56, the resource units for synchronization channels 56a, 56b and 56c again use the same frequency band in the center of the sub-band but extended to three TDM units occupying only 3 last symbols.

In solutions according to the invention, sub-frames with synchronization channel may be placed anywhere in the radio frame. In one embodiment of the present invention, with 10 ms EUTRA DL radio frame consisting of 20 sub-frames, the synchronization channels are placed in one sub-frame. This may be the first, the last, or any intermediate sub-frame, the only important factor is that there is a specified timing relation between the SCHs and the radio frame.

Figure 5:
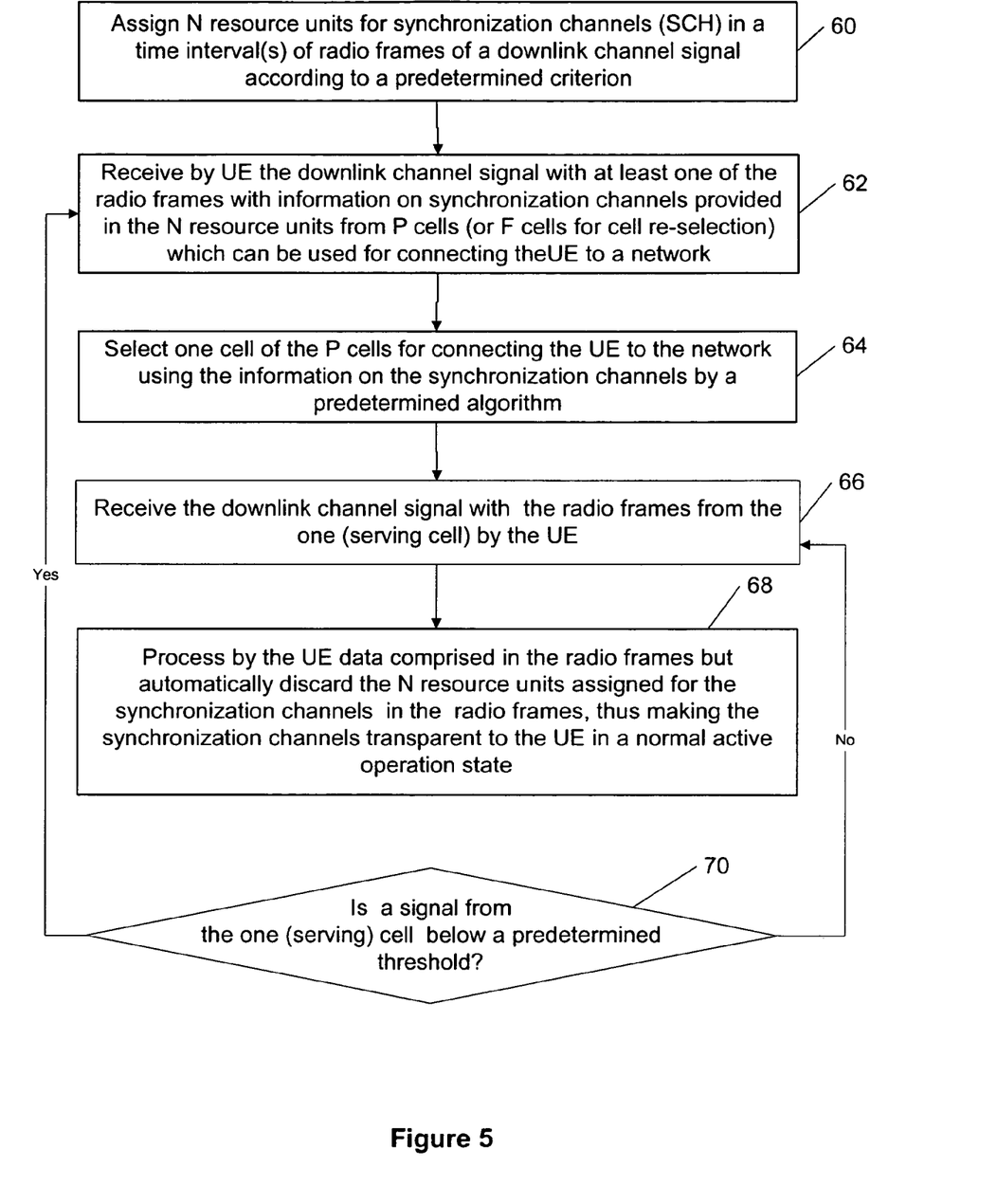
FIG. 5 is a flow chart demonstrating locating downlink synchronization channels transparent to shared channel users, according to an embodiment of the present invention.

FIG. 5 is a flow chart demonstrating downlink locating synchronization channels transparent to shared channel users, which can be used, e.g., in the evolved UTRA, according to an embodiment of the present invention.

The flow chart of FIG. 5a only represents one possible scenario among others. The order of steps shown in FIG. 5 is not absolutely required, so generally, the various steps can be performed out of order. In a method according to the first embodiment of the present invention, in a first step 60, the N resource units for the synchronization channels (SCH)) are assigned in the predetermined position in the predetermined time interval or predetermined time intervals of each of the radio frames of the downlink channel signal, according to a predetermined criterion. In a next step 62, the downlink channel signal is received by the UE 10 with the initial radio frames comprising information on the synchronization channels provided in the N resource units from P cells or F cells for a cell re-selection, said synchronization channels can be used for connecting the UE 10 to a network, P and F each being integers of at least a value of one, wherein the P cells and the F cells can be same or different cells. In a next step 64, one cell (e.g., 20-K) of the P (or F for the reselection) cells is selected for connecting the UE 10 to the network using the information on the synchronization channels by the predetermined algorithm.

In a next step 66, the downlink channel signal with the radio frames from the one (serving cell) 20-K is received by the UE 10. In a next step 68, the data comprised in the radio frames is processed by the UE but the N resource units assigned for the synchronization channels in the radio frames are automatically discarded, thus making the synchronization channels transparent to the UE in the normal active operation state.

Finally, in a next step 70, it is ascertain whether the signal power from the one (serving) cell 20-K is below the predetermined threshold? If that is not the case, the process goes to the step 66 and the cell 20-K continues to be a serving cell. However, if it is determined that the signal power from the one (serving) cell 20-K is below the predetermined threshold, the process goes back to the step 62 and the cell reselection starts following the procedure described above.

As explained above, the invention provides both a method and corresponding equipment consisting of various modules providing the functionality for performing the steps of the method. The modules may be implemented as hardware, or may be implemented as software or firmware for execution by a computer processor. In particular, in the case of firmware or software, the invention can be provided as a computer program product including a computer readable storage structure embodying computer program code (i.e., the software or firmware) thereon for execution by the computer processor.

In the embodiments of the invention described herein, the concept of synchronization channel can possibly mean any channel, or collection of channels, that an active mode terminal is not interested in receiving from its serving cell. This includes the true synchronization channels, as discussed above, used for time and frequency synchronization. In addition, it may include a broadcast channel, where System Information is transmitted describing, e.g., the full operation bandwidth in the cell, the relation of the synchronization channel bandwidth to the full bandwidth, and other system parameters that do not change in time. Also, this may include a paging channel and/or a paging indicator channel, where pages for idle mode terminals are transmitted. Thus for the purpose of this invention, the term "synchronization channels" have a broad interpretation which may include the broadcast and possibly paging and paging indicator channels. Also, it is noted that the one or more allocatable resources (resource units) in a sub-frame assigned to these channels may not be fully used by these channels. As long as these allocatable resources in sub-frames with these channels present cannot be allocated to shared channel users, the resources are considered to be assigned to the synchronization channels.

It is to be understood that the above-described arrangements are only illustrative of the application of the principles of the present invention. Numerous modifications and alternative arrangements may be devised by those skilled in the art without departing from the scope of the present invention, and the appended claims are intended to cover such modifications and arrangements.

What is claimed is:

1. A method, comprising:

receiving a downlink channel signal with at least one frame of radio frames by a user equipment from a network element, wherein N resource units are assigned for synchronization channels in a predetermined position in at least one predetermined time interval of each of said radio frames of the downlink channel signal, said N resource units comprise information used by the user equipment for selecting said network element when the user equipment is in a cell selection or reselection operation state, N being at least a value of one; and reading signaling containing information about an allocation of the N resource units in the downlink channel signal for the user equipment in a normal active operation state, and processing in the user equipment data comprised in said at least one frame but automatically discarding said N resource units assigned for the synchronization channels in said at least one predetermined time interval of said at least one frame, for making said synchronization channels transparent to the user equipment, if the signaling contains an indication that said N resource units are not allocated to said user equipment when said user equipment is in the normal active operation state.

2. The method of claim 1, wherein before the receiving the downlink channel signal with said at least one frame of said radio frames, the method comprises:

receiving the downlink channel signal with at least one initial frame of said radio frames by the user equipment, wherein information on said synchronization channels is provided in the N resource units from P cells for connecting the user equipment to a network, P being at least a value of one; and selecting one cell of said P cells for connecting said user equipment to the network using the information on said synchronization channels by a predetermined algorithm, wherein said network element is said one selected cell.

3. The method of claim 1, wherein each of the N resource units has a duration of K symbols comprising a single time division multiplexing period and each of the N resource units has one or more frequencies chosen out of M frequency bands of orthogonal frequency division multiplexing, K and M each being at least a value of one.

4. The method of claim 1, wherein said at least one predetermined time interval comprises a symbol for a common control channel carrying an allocation table and at least one symbol comprising data; wherein said allocation table does not allocate said N resource units to said user equipment when said user equipment is in the normal active operation state.

5. The method of claim 1, further comprising:

processing, instead of automatically discarding, said N resource units assigned for the synchronization channels in said at least one predetermined time interval of said at least one frame by said user equipment, for evaluating said synchronization channels provided from said one cell and F-1 neighbouring cells for connecting the user equipment to said network, F being at least a value of one;

re-selecting one cell of said F-1 cells for connecting said user equipment to the network using said predetermined algorithm;

receiving the downlink channel signal with at least one further frame of said radio frames from said reselecting cell by the user equipment; and processing data comprised in said at least one further frame but automatically discarding said N resource units assigned for the synchronization channels in said at least one predetermined time interval of said at least one further frame by said user equipment, for making said synchronization channels transparent to the user equipment in the normal active operation state.

6. The method of claim 5, wherein said P cells and F-1 cells are nodes B, base transceiver stations or their combination thereof.

7. The method of claim 1, wherein said at least one predetermined time interval is a sub-frame of a radio frame of said radio frames.

8. The method of claim 7, wherein said synchronization channels are placed in one sub-frame of said radio frame.

9. The method of claim 7, wherein said radio frame is 10 ms and said sub-frame is 0.5 ms.

10. The method of claim 1, wherein said downlink channel signal comprises a downlink shared channel.

11. The method of claim 1, wherein at least one of said synchronization channels is a primary synchronization channel.

12. The method of claim 1, wherein at least one of said synchronization channels is a secondary synchronization channel.

13. The method of claim 1, wherein said assigning is performed by a system designer or by a network comprising said network element.

14. A computer program product comprising: a computer readable storage structure embodying a computer program code thereon for execution by a computer processor with said computer program code, wherein said computer program code comprises instructions for performing the method of claim 1.

15. A system for locating synchronization channels in a downlink, comprising:

a network element, configured to provide a downlink channel signal, wherein N resource units are assigned for the synchronization channels in a predetermined position in at least one predetermined time interval of each of radio frames of said downlink channel signal, said N resource units comprise information used for selecting said network element, N being at least a value of one; and a user equipment, configured to select the network element when the user equipment is in a cell selection or reselection operation state, configured to receive the downlink channel signal with at least one frame of said radio frames from the network element, configured to read signaling containing information about an allocation of the N resource units in the downlink channel signal for the user equipment in a normal active operation state, and configured to process data comprised in said at least one frame but to automatically discard said N resource units assigned for the synchronization channels in said at least one predetermined time interval of said at least one frame, for making said synchronization channels transparent to the user equipment in a normal active operation state, if the signaling contains an indication that said N resource units are not allocated to said user equipment when said user equipment is in the normal active operation state.

16. The system of claim 15, wherein before said receiving of the downlink channel signal with said at least one frame of said radio frames, the user equipment is configured to receive the downlink channel signal with at least one initial frame of said radio frames, wherein information on said synchronization channels is provided in the N resource units from P cells for connecting the user equipment to a network, P being at least a value of one, and wherein further the user equipment is configured to select one cell of said P cells for connecting said user equipment to the network using the information on said synchronization channels by a predetermined algorithm, wherein said network element is said one selected cell.

17. The system of claim 16, wherein said P cells are nodes B, base transceiver stations or their combination thereof.

18. The system of claim 15, wherein said at least one predetermined time interval is a sub-frame of the radio frame.

19. An apparatus, comprising:

a receiving/transmitting/processing module, responsive to a downlink channel signal with at least one frame of radio frames from a network element selected by the apparatus, wherein N resource units are assigned for synchronization channels in a predetermined position in at least one predetermined time interval of each of said radio frames of the downlink channel signal, said N resource units comprise information used by the user equipment for selecting said network element for when the user equipment is in a cell selection or reselection operation state, N being at least a value of one, and also responsive to a control signal containing information about an allocation of the N resource units in the downlink channel signal for the apparatus in a normal active operation state, and configured to process data comprised in said at least one frame but to automatically discard the N resource units assigned for the synchronization channels in the predetermined position in the at least one predetermined time interval of said at least one frame, for making said synchronization channels transparent to the apparatus in the normal active operation state, if the control signal contains an indication that said N resource units are not allocated to said apparatus when said apparatus is in the normal active operation state; and a synchronization channel and allocation control block, configured to provide the control signal for automatically discarding said N resource units.

20. The apparatus of claim 19, wherein the synchronization channel and allocation control block is also for providing a control signal for not discarding but processing said N resource units by the apparatus.

21. The apparatus of claim 19, wherein the receiving/transmitting/processing module is configured for receiving the downlink channel signal with at least one initial frame of said radio frames, wherein information on said synchronization channels is provided in the N resource units from P cells for connecting the apparatus to a network, P being at least a value of one, and further the apparatus is configured for selecting one cell of said P cells for connecting said apparatus to the network using the information on said synchronization channels by a predetermined algorithm, wherein said network element is said one selected cell.

22. The apparatus of claim 19, wherein each of the N resource units has a duration of K symbols comprising a single time division multiplexing period and each of the N resource units has one or more frequencies chosen out of M frequency bands of orthogonal frequency division multiplexing, K and M each being at least a value of one.

23. The apparatus of claim 19, wherein said at least one predetermined time interval comprises a symbol for a common control channel carrying an allocation table and at least one symbol comprising data; wherein said allocation table does not allocate said N resource units to said apparatus when the apparatus is in the normal active operation state.

24. The apparatus of claim 19, wherein said at least one predetermined time interval is a sub-frame of a radio frame of said radio frames.

25. The apparatus of claim 24, wherein said synchronization channels are placed in one sub-frame of said radio frame.

26. The apparatus of claim 24, wherein said radio frame is 10 ms and said sub-frame is 0.5 ms.

27. The apparatus of claim 19, wherein said downlink channel signal comprises a downlink shared channel.

28. The apparatus of claim 19, wherein at least one of said synchronization channels is a primary synchronization channel.

29. The apparatus of claim 19, wherein at least one of said synchronization channels is a secondary synchronization channel.

30. The apparatus of claim 19, wherein an integrated circuit comprises the receiving/transmitting/processing module and the synchronization channel and allocation control block.

31. An apparatus, comprises:
an allocation control block, configured to provide a downlink channel signal to a user equipment, wherein N resource units are assigned for synchronization channels in a predetermined position in at least one predetermined time interval of each of radio frames of said downlink channel signal, said N resource units comprise information used by the user equipment for selecting said network element a network when the user equipment is in a cell selection or reselection operation state N being at least a value of one, said N resource units comprise information used by the user equipment for selecting said apparatus for communicating with a network, wherein, after said apparatus is selected by the user equipment, and after the user equipment reads signaling provided from the apparatus containing information about an allocation of the N resource units in the downlink channel signal, said N resource units are automatically discarded by the user equipment while processing data comprised in the radio frames, for making said synchronization channels transparent to the user equipment in a normal active operation state, if the signaling contains an indication that said N resource units are not allocated to said user equipment when said user equipment is in the normal active operation state.

32. The apparatus of claim 31, wherein said at least one predetermined time interval is a sub-frame of a radio frame of said radio frames.

33. An apparatus, comprising:
means for receiving, transmitting and processing, responsive to a downlink channel signal with at least one frame of radio frames from a network element selected by the apparatus, wherein N resource units are assigned for synchronization channels in a predetermined position in at least one predetermined time interval of each of said radio frames of the downlink channel signal, said N resource units comprise information used by the user equipment for selecting said network element when the user equipment is in a cell selection or reselection operation state, N being at least a value of one, and also responsive to a control signal containing information about an allocation of N resource units in the downlink channel signal for the apparatus in a normal active operation state, for processing data comprised in said at least one frame but automatically discarding the N resource units assigned for the synchronization channels in the predetermined position in the at least one predetermined time interval of said at least one frame, thus making said synchronization channels transparent to the apparatus in a normal active operation state, if the control signal contains an indication that said N resource units are not allocated to said apparatus when said apparatus is in the normal active operation state; and means for synchronization and control, for providing the control signal for automatically discarding said N resource units.

34. The apparatus of claim 33, wherein the means for synchronization and control are also for providing a control signal for not discarding but processing said N resource units by the apparatus.

35. A method, comprising:
sending a downlink channel signal with at least one frame of radio frames by a network element to a user equipment, wherein N resource units are assigned for synchronization channels in a predetermined position in at least one predetermined time interval of each of said radio frames of the downlink channel signal, said N resource units comprise information used by the user equipment for selecting said network element for communicating when the user equipment is in a cell selection or reselection operation state, N being at least a value of one, and also responsive to a control signal containing information about an allocation of N resource units in the downlink channel signal for the apparatus in a normal active operation state, for processing by the user equipment data comprised in said at least one frame but automatically discarding said N resource units assigned for the synchronization channels in said at least one predetermined time interval of said at least one frame, for making said synchronization channels transparent to the user equipment in a normal active operation state, wherein said at least one predetermined time interval comprises an indication that said N resource units are not allocated to said user equipment when said user equipment is in the normal active operation state, if the control signal contains an indication that said N resource units are not allocated to said apparatus when said apparatus is in the normal active operation state.

36. The method of claim 35, wherein said at least one predetermined time interval is a sub-frame of a radio frame of said radio frames.

37. A network node comprising:
   one or more modules configured to:
   provide a downlink channel signal with at least one frame of radio frames by a user equipment from a network element, wherein N resource units are assigned for synchronization channels in a predetermined position in at least one predetermined time interval of each of said radio frames of the downlink channel signal, said N resource units comprise information used by the user equipment for selecting said network element when the user equipment is in a cell selection or reselection operation state, N being at least a value of one; and
   provide signaling containing information about the allocation of resource units in the downlink channel signal for the user equipment in a normal active operation state, so that the user equipment processes data comprised in said at least one frame but automatically discards said N resource units assigned for the synchronization channels in said at least one predetermined time interval of said at least one frame, for making said synchronization channels transparent to the user equipment, if the signaling contains an indication that said N resource units are not allocated to said user equipment when said user equipment is in the normal active operation state.

* * * * *